Oct. 16, 1962  A. G. MAKOWSKI  3,058,150
LOADING AND UNLOADING OF ASSEMBLY MACHINES
Filed March 31, 1959  6 Sheets-Sheet 1

Fig. 1.

INVENTOR.
ALEXANDER GEORGE MAKOWSKI
BY Russell L. Root
George W. Reiber
ATTORNEYS

Fig. 4.

Oct. 16, 1962 A. G. MAKOWSKI 3,058,150
LOADING AND UNLOADING OF ASSEMBLY MACHINES
Filed March 31, 1959 6 Sheets-Sheet 6

INVENTOR.
ALEXANDER GEORGE MAKOWSKI
BY Russell L. Root
George W. Reiber
ATTORNEYS

3,058,150
LOADING AND UNLOADING OF ASSEMBLY MACHINES
Alexander George Makowski, Fayville, Mass., assignor to American Can Company, New York, N.Y., a corporation of New Jersey
Filed Mar. 31, 1959, Ser. No. 803,247
16 Claims. (Cl. 18—4)

This invention relates to assembling, and especially to automatically loading and/or unloading the work elements of assembly machinery.

In one particular form, the invention relates to machinery for injection molding thermoplastic container heads, and especially to equipment for simultaneously removing from the molding dies a completed container while loading a tubular plastic body into the dies in preparation for the next molding operation.

Heretofore containers have been built by loading plastic tubes manually onto a mandrel or male die part, closing the dies, injection molding a head thereon, and then removing the container from the mandrel either manually or by blowing the container off into a random storage bin. Machinery of this sort is shown in U.S. patent application S.N. 447,974 now U.S. Patent No. 2,883,706; and a variant is illustrated in my copending application S.N. 747,996 filed July 11, 1958 showing the particular form of die arrangement with which the herein disclosed device is most especially designed to cooperate.

It is one object of the present invention to provide equipment for transferring flexible plastic body tubes or other preformed parts from a feed track to operating position in an assembly machine without manual interference.

It is another object of the invention to remove completed containers or articles automatically from the working elements of the assembly machine in an individual fashion under directional control ready for orderly transfer to other operations.

It is a further object of the invention to arrange for accomplishment of the two foregoing objects simultaneously, with portions of the equipment acting in both capacities at once.

Another object of the invention is to handle tubular plastic container bodies approaching on one track and place them individually in the molding dies of a molding machine, and thereafter remove them from the dies and place them individually on conveyor means for carrying them away, all without manual interference.

A feature of the present invention is the provision of a reciprocable slide movable between the working members or opened dies of a molding or other assembly machine to receive from one of the members or dies, by a frictional gripping action, a completed article placed therein by ejection equipment related to the members or dies.

Another feature of the invention is the provision of a reciprocable slide movable between the opened members or dies and having carrying means for presenting to the dies a preformed part to be incorporated in the completed article.

Another feature of the invention is the provision of a single reciprocable slide movable between the opened members or dies and acting simultaneously to effect the operations outlined in both of the two immediately foregoing features.

Still another feature of the invention is the provision of a reciprocable slide according to either of the two immediately foregoing features, which also incorporates pusher means operable on one of the slide strokes for effecting displacement of approaching preformed parts from their track or conveyor into operative relation to loading means therefor.

A still further feature of the invention is the provision of a reciprocable unloading slide arrangement as in any of the foregoing features, which includes improved gate means cooperating with a conveyor to provide for unloading holders filled with completed articles from the slide and loading empty article holders into the slide ready for another operation thereof.

Additional objects, features and advantages will hereinafter appear as the description proceeds.

Figure 2:
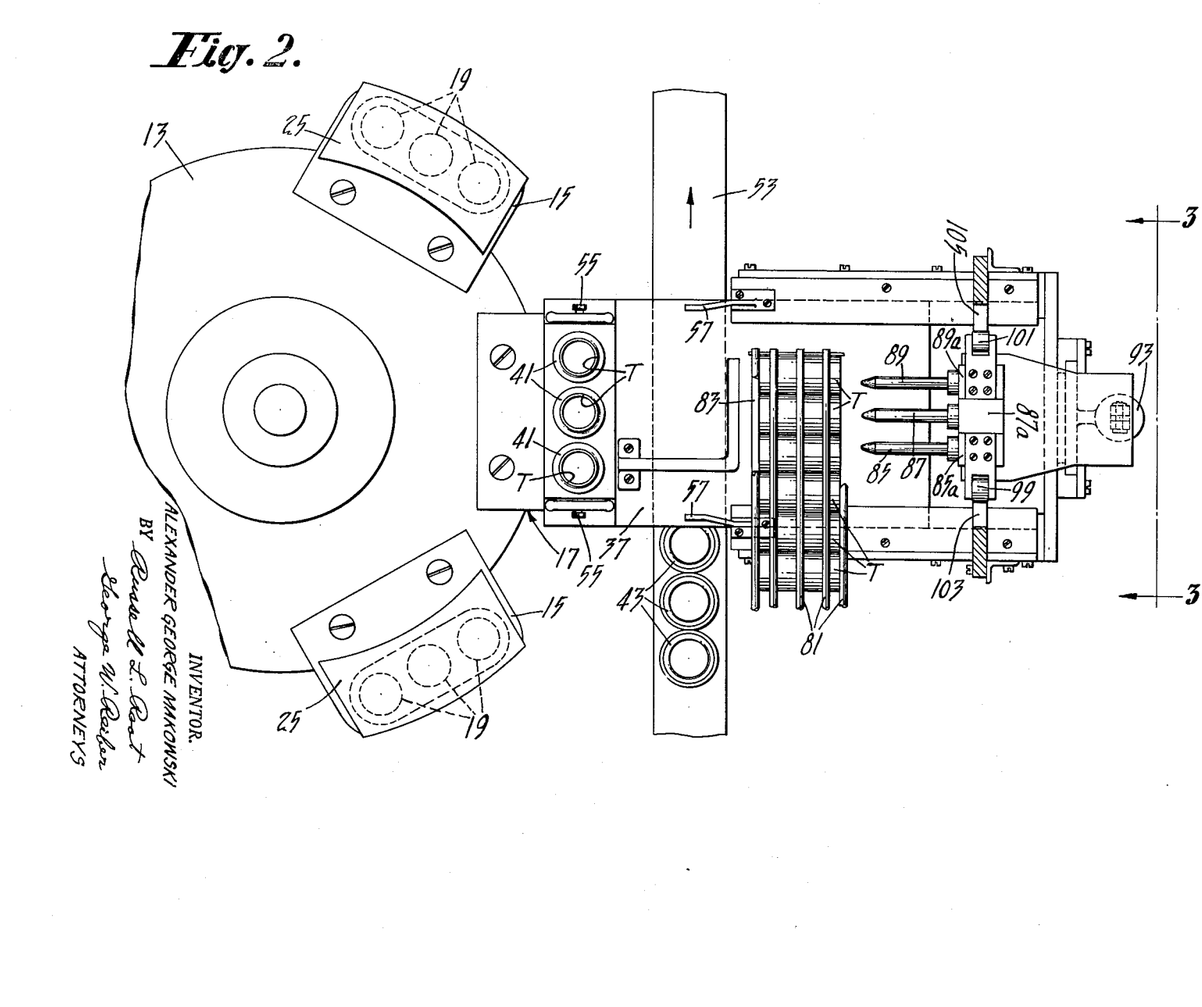
FIG. 2 is a sectional plan taken substantially on line 2—2 of FIG. 1.

Referring to the drawing, there is presented an assembly machine, shown for convenience as an injection molding machine 11 having an indexing table 13 for carrying a series of work holders or working members, shown as gang dies 15 (see FIG. 2). The table 13 is operated by suitable conventional indexing mechanism (not shown) for sequentially bringing each gang 15 in turn into operative relationship to a conventional work station, in the present instance an injection head (not shown).

The present invention has to do primarily with the loading and/or unloading of these dies at a loading and/or unloading station 17 (FIG. 2).

Figure 1:
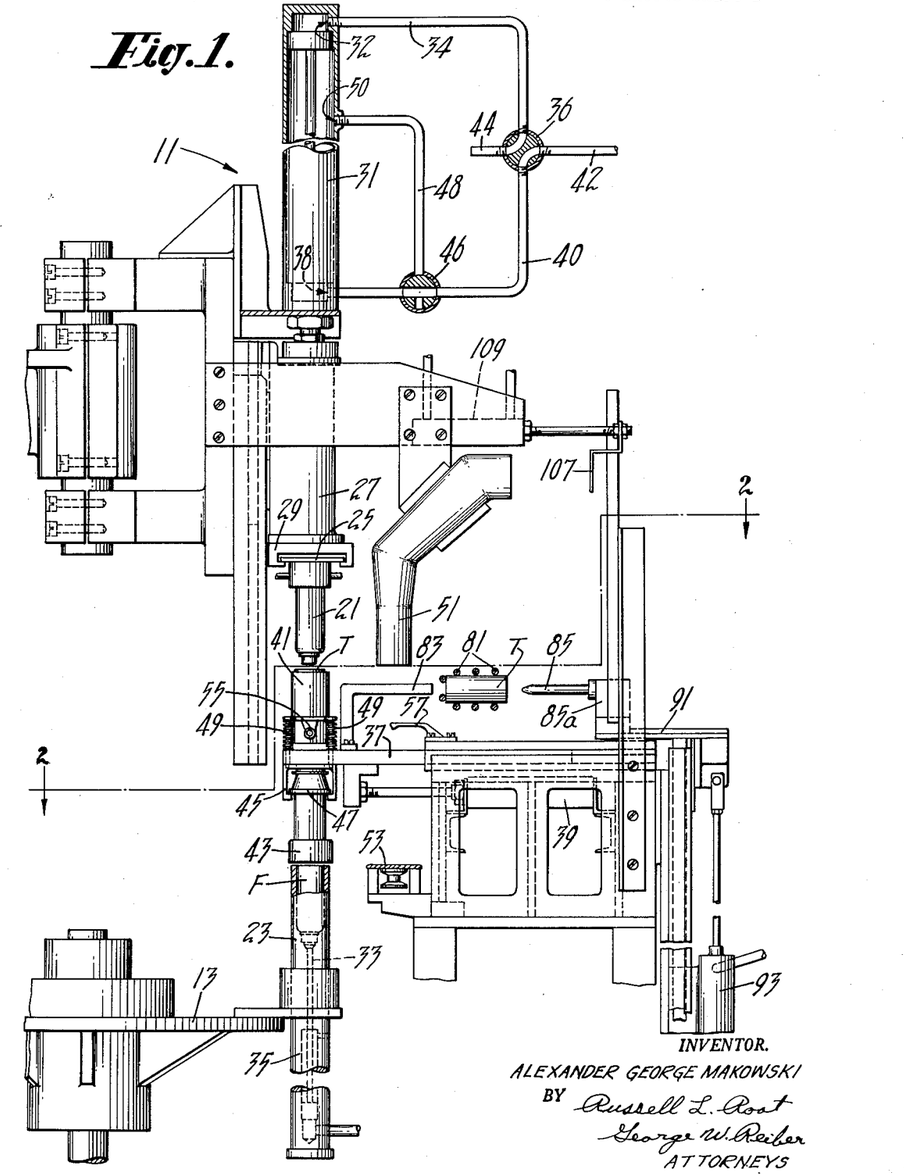
FIG. 1 is a front elevation of a portion of an assembly machine showing a loading and unloading device according to the present invention, with a portion of the hydraulic control therefor being schematically shown.

For convenience, each of the gang dies 15 is shown as being made up of three individual dies 19, all of which act simultaneously either to do work, as in receiving an injection of molding material or to unload completed work, whereby to multiply the output of the machine. The particular molding machine 11, shown in the drawings is of a type designed for injecting heads or ends on preformed plastic tubular bodies to form containers therefrom, so that each die 19 includes a mandrel 21 for receiving a preformed tube T and, designed to cooperate there with a female die member 23 to form between itself and the mandrel a head cavity for molding a head in welded relation to the end of the tube T. The female dies 23 are integrally attached to the table 13, and the mandrels 21 are assembled in cooperating gangs by top plates 25 whose edges are curved to radii determined by the distance to the center of table 13. Slidably mounted on the machine for vertical reciprocation at a suitable point adjacent the unloading station 17, is a pick-up head 27 carrying at its lower end a channel member 29 dimensioned to slidingly receive each top plate 25 in turn as the table 13 is indexed around. A reciprocating motor such as air cylinder 31, FIG. 1, is provided for raising and lowering the head 27 together with whichever of the top plates 25 (with its attached mandrels) is engaged with the channel 29 at the time. Each female die 23 is provided with a reciprocable ejector pin 33 and suitable moving means therefor, such as air cylinder 35, capable, when actuated, of raising pin 33 and pushing a completed workpiece upwardly clear of the die 23.

It will be understood that suitable conventional control mechanism is provided for opening and closing of the dies 19 by cylinder 31 and for actuating the ejector pin 33 by cylinder 35, all in proper timed relation with the operation being performed at the work or injection station, and likewise in proper timed relation to the indexing movements of table 13, as is well known. In addition, a similarly timed dipping of head 29 to an intermediate position coincident with the raising of ejector pin 33 is provided for. In this connection it will be noted that one convenient from of control for the cylinder 31 is shown schematically in FIG. 1 wherein an upper port 32 is connected via a line 34 to a port in the body of a four-way valve 36. A lower cylinder port 38 is connected via line 40 with an opposed port of the valve 36. The other opposed ports of the valve 36 are connected to pressurized air source 42 and to atmosphere as at 44. The line 40 includes a three-way valve 46, the third port of which is connected via a line 48 to a side port 50 in the cylinder wall, so located as to define the lower position which the piston of the cylinder 31 will assume on its above-mentioned dipping motion. Thus, with the valves 36 and 46 as pressently positioned, air pressure via line 40 and port 38 holds the head 27 raised. When it is time to close the dies fully, the core of valve 36 is rotated 90 degrees whereupon pressure via line 34 acts on the piston through line 34 and port 32, lowering the head 27, the cylinder being vented through line 40 and exhaust 44. Reversing valve 36, of course, returns the head 27 to raised position. When it is time to dip the head to intermediate position only, valve 36 is rocked as before, but the core of three-way valve 46 is also rocked 90° anti-clockwise simultaneously. This places pressure on top of the piston as before, but the cylinder is vented via lines 48 and 40 only so long as port 50 is uncovered so that downward movement stops as soon as port 50 is sealed off by the piston and the pressures in both ends equalized. When it is desired to return the head 27 from dipped to raised position, the cores of both valves, 36 and 46, are simultaneously rocked back to initial position.

Figure 4:
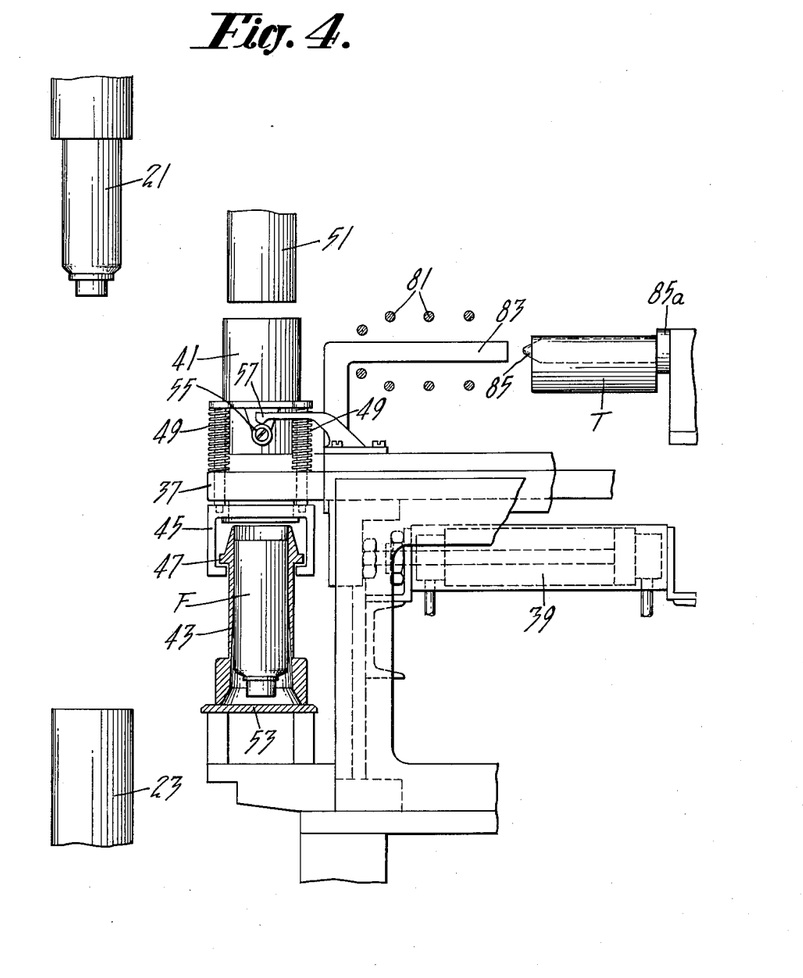
FIG. 4 is a detailed elevation with parts in section, similar to a portion of FIG. 1, but to a larger scale and showing the slide in retracted position.

The loading and unloading mechanism for the assembly machine comprises a horizontally reciprocable slide 37 actuated by any suitable reciprocating mechanism such as hydraulic cylinder 39 and carrying at its head end three upwardly opening loading cups 41 and three downwardly opening carriers 43 for unloading finished work pieces or containers F. The carriers 43 are preferaby separable from the slide 37 so as to be transportable to other subsequent work stations to assist in handling the workpieces thereat and while attached to the slide are held firmly thereto by an upwardly acting channel clamp 45 which engages under suitable rings 47 on the carriers 43 and urges them firmly upwardly against the bottom of the slide 37 through the offices of springs 49 (see especially FIG. 4).

Operation of the slide is such that the same remains in retracted position whenever the table 13 is indexing, and is moved to extended position whenever the table 13 is stationary and the pick-up head 27 has been raised to open the die gang 15 then at the unloading station. Electromagnetically actuated valves in the hydraulic circuit to cylinder 39, triggered by microswitches adjacent the moving parts of the indexing mechanism itself or timing elements, such as cams, controlling the same, and adjacent the cylinder pick-up head 27 respectively, may be used to this end in a well-understood fashion.

When the slide 37 is in extended position, as seen in FIG. 1, the cups 41 underlie the mandrels 21 in alignment therewith, and the holders 43 overlie the female die members 23 in alignment with the latter.

When the slide 37 is in retracted position, the cups 41 underlie the discharge ends of three chutes 51, while the holders 43 are placed above a conveyor chain 53 which runs continuously in a direction transversely of the motion of slide 37. Actually upon approaching fully retracted position the channel clamp 45, via rollers 55 carried thereby (FIGS. 2 and 4) is depressed by cams 57 fixed to the frame of the machine. When the cams 57 depress the clamp 45 against the force of springs 49, those holders 43 which the slide is then carrying are dropped upon the surface of conveyor chain 51 and promptly carried away, to be replaced by empty holders in a manner best illustrated in FIG. 5. In that figure can be seen the stream of approaching empty holders 43 approaching the slide 37 on chain 53 and arrested by an inlet gate 59 shown as spring urged to closed position and actuated to open position by suitable power means such as solenoid 61. At the other side of the slide is an outlet gate 63, shown as spring urged to open position and actuated to closed position by a solenoid 65. The solenoids are in parallel and are simultaneously controlled by normally open switches 67 and 69 which are in series in the supply circuit to solenoids 61 and 65, represented by source 70 of electrical energy and conductors 71 and 73. The switch 67 is positioned to be closed by the slide 37 as it moves to retracted position, and the switch 69 is arranged to be closed at a short predetermined interval thereafter sufficient to allow escape of all the filled holders 43 from the slide after being released by clamp 45 and dropped on conveyor 53. Any suitable timing reference on the machine 11 which uniformly acts at the appropriate time may be used to actuate the switch 69, but for convenience and simplicity the switch is shown as being actuated through a predetermined time delay mechanism 75 whose time is initiated by a solenoid 77 energized by a switch 79, closed simultaneously with the switch 67.

While the power actuation for the clamp 45 has been shown and described for simplicity as opposed spring and cam means, it will be appreciated that suitable alternatives exist such as air cylinders controlled by solenoid valves triggered by switches responsive to the position of slide 37.

Adjacent the slide 37 is the terminus of an open-work feed track 81 (FIGS. 1, 2 and 4) which leads the plastic tubes, preferably by rolling action assisted by gravity, to a side-by-side ready position for loading onto the slide. The tubes are, of course, in side contact with each other and may be, because of their flexibility, slightly flattened by the weight of the approaching supply in the feed track, and the present invention includes spreading means for locating the tubes at a center spacing suited to that needed by the dies 19 of the gangs 15.

Figure 3:
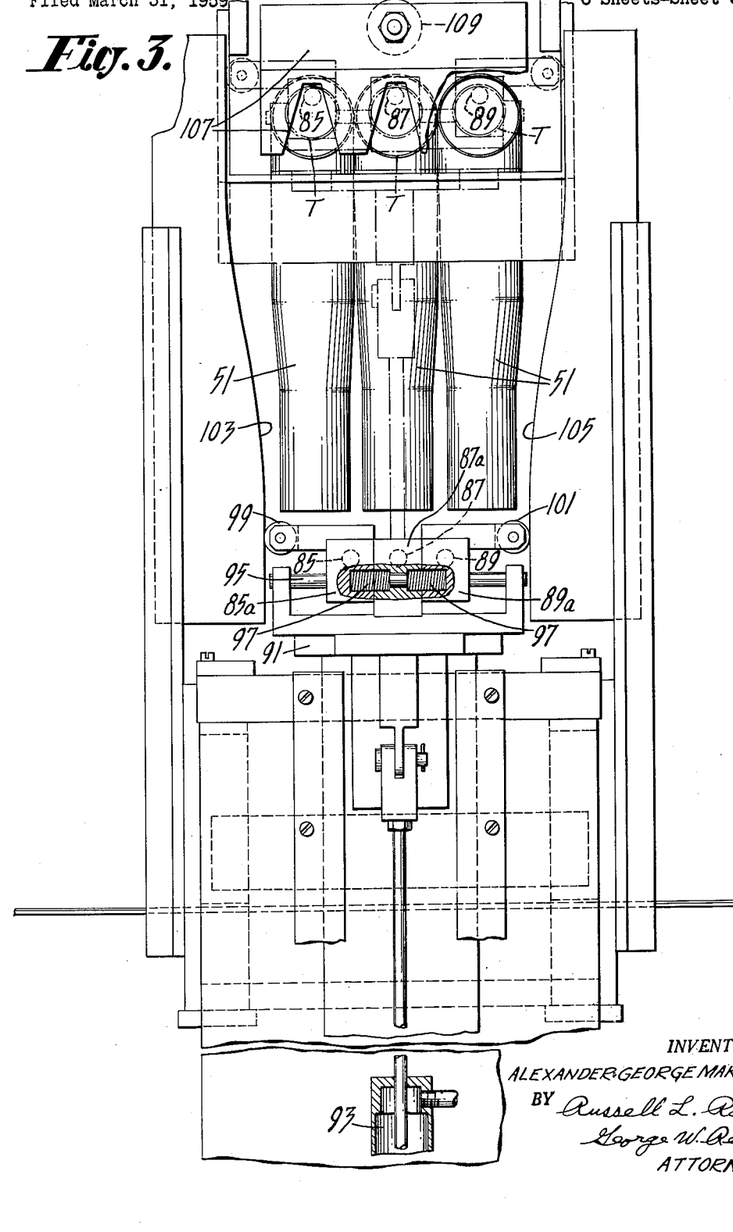
FIG. 3 is an elevational detail of the spreading and elevating mechanism, to a larger scale, taken substantially on line 3—3 of FIG. 2, parts being broken away and shown in section, and parts being shown in a secondary position in dotted lines.

Attached to the slide 37 and extending rearwardly thereon is a pusher bar 83 having a transverse length sufficient to span the three endmost tubes T as they are positioned in the track 81. Normally positioned substantially in line with the three end tubes are pins 85, 87 and 89 mounted on a vertically sliding carriage 91 which is reciprocated by a suitable motor such as air cylinder 93. The pins are also movably supported on the carriage 91 by being mounted on blocks 85a, 87a and 89a on a transverse rod 95, the outer two 85a and 89a being arranged for lateral movement thereon, and springs 97 being introduced between the blocks to urged block 85 and 89 outwardly. The outer blocks 85a and 89a carry follower rollers 99 and 101 respectively, which ride against cam surfaces 103 and 105 respectively. The cam surfaces are so designed that when the carriage 91 is in lowered position the pins 85, 87 and 89 line up with the three end tubes T in track 81, and when the carriage is in raised position, tubes carried by the pins are spread to positions aligning them with the mouths of chutes 51, as seen in dotted lines in FIG. 3. When the carriage 91 is in lowered position, and the slide 37 is moved to retracted position, the three end tubes T are pushed by pusher bar 83 from the track 81 to the pins 85, 87 and 89, ready for spreading.

When the carriage 91 is raised, the spread pins 85, 87 and 89 move into correspondingly positioned notches in a notched stripper plate 107 which can be actuated by a suitable motor, e.g. air cylinder 109 (FIG. 1), to strip the tubes T from pins 85, 87 and 89, and into their respective chutes 51.

It will be understood that retraction of the slide 37, raising of carriage 91 and actuation of stripper plate 107, since they occur in a predetermined sequence, can be readily triggered one from the other by well-known limit switch techniques.

In the particular form of the invention shown, the items handled are rather soft, thin, flexible plastic tubes, and it will be understood that their transfer from cups 41 to mandrels 21 is effected by reason of their close friction fit on the mandrel, while retention of the completed article in holders 43 is likewise due to a close friction fit of the outer surfaces of the completed containers within the bores of the holders 43. Of course, in instances where other types of preforms and/or completed work pieces are to be handled, alternative mechanical, pneumatic, magnetic and the like holding devices may be resorted to.

In operation, it will be understood that the slide 37 is intended to have its forward end extended between the parts 21 and 23 of dies 19 while they are held apart by the pick-up head at loading station 17, and then to be withdrawn to permit closing of the dies by the pick-up head 27, so that they may be indexed onto a work station. The slide is shown in FIG. 1 just as it reaches its extended position with fresh tubes T loosely held in the loading cups 41, and three empty holders 43 clamped to its under surface by clamp 45. The table 13, of course, is stationary, and the loading and unloading movements are about to take place.

Simultaneously the machine timing raises the ejector pin 33 by cylinder 35, and actuates the valves 36 and 46 to send the piston of cylinder 31 to its intermediate position, thus dipping the mandrels 21 into cups 41. Thus, respectively, completed containers F are raised into frictionally held position in the holders 43, and the mandrels 21 penetrate into and frictionally pick up fresh tubes T. These actions are shown schematically in FIG. 6. Both of these operations are so instrumented that upon completion of movement they trigger a reversal of controls and initiate their own immediate return.

Figures 5, 6, 7:
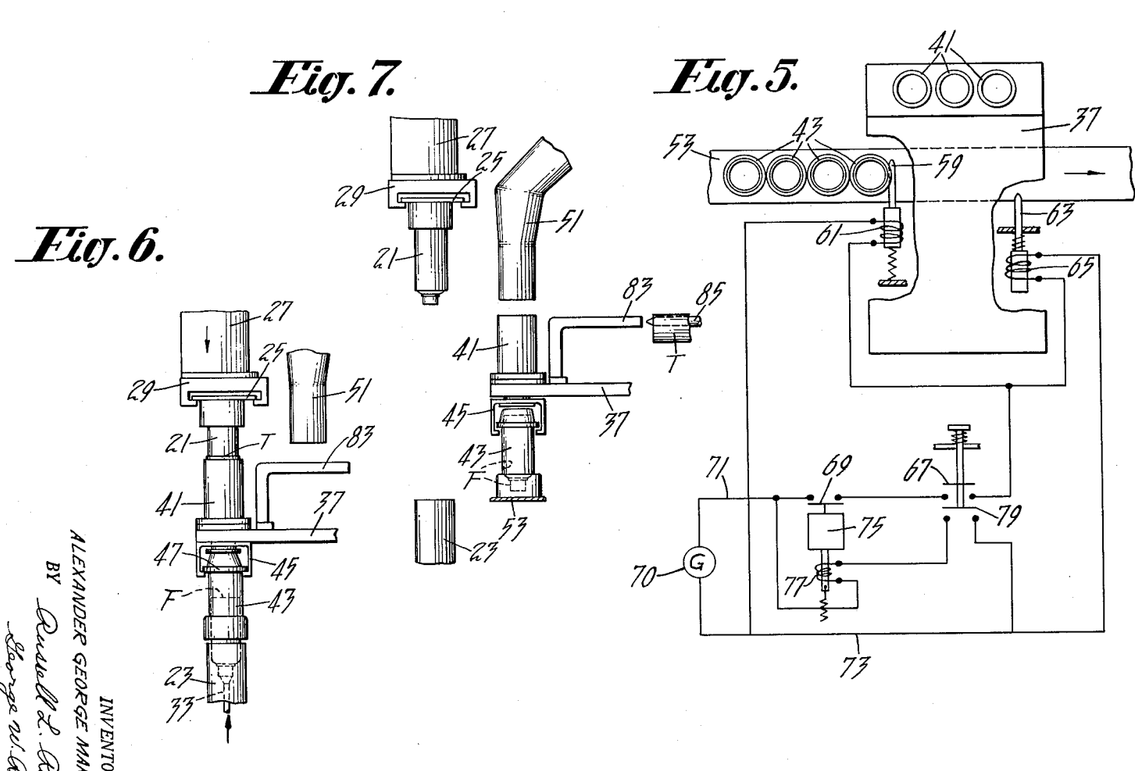
FIG. 5 is a schematic plan of the slide and a conveyor for serving the same, showing the cooperating gate elements and an electrical control circuit diagram therefor.
FIGS. 6, 7, 8, 9 and 10 are schematic views illustrating the operation of the device and showing the parts in a series of consecutive positions.

As soon as the mandrel 21 and ejector pin 33 are fully withdrawn, cylinder 39 is triggered to withdraw the slide 37 to retracted position as shown in FIG. 7, (also in greater detail in FIG. 4), and several things occur more or less simultaneously, as follows:

(1) Cams 57 acting on rollers 55 depress clamp 45 and release the filled holders 43 which drop into contact with conveyor chain 53 to be rapidly carried away thereby to subsequent work stations.

(2) Pusher 83 thrusts the next three fresh tubes transversely out of the track 81 and over the ends of pins 85, 87 and 89.

(3) Now empty cups 41 are spotted in a receiving position beneath the discharge ends of chutes 51.

(4) Switch 67 (FIG. 5) is closed to ready the circuit for subsequent actuation of gates 59 and 63.

Figure 8:
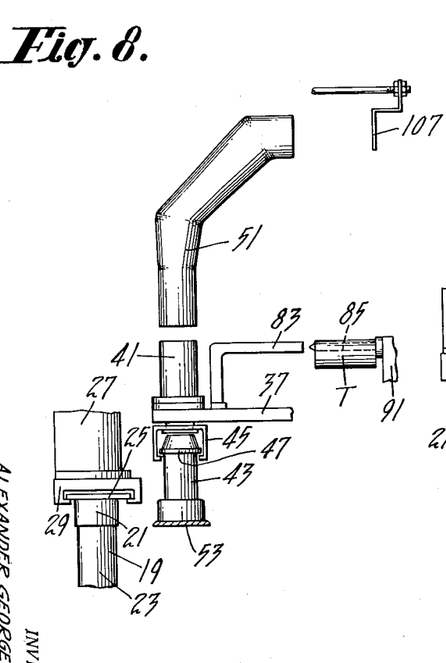

At any convenient time after the slide 37 is retracted, of course, cylinder 31 will be actuated through a full stroke to lower pick-up head 27 as seen in FIG. 8, whereupon the tubes T on mandrels 21 are enclosed within their dies 19 and may be indexed away to the work station while a fresh gang 15 of dies 19 is indexed into station 17 with its top plate 25 in interlocking relationship to the channel 29 of the pick-up head 27, ready to be opened.

Figures 9, 10:
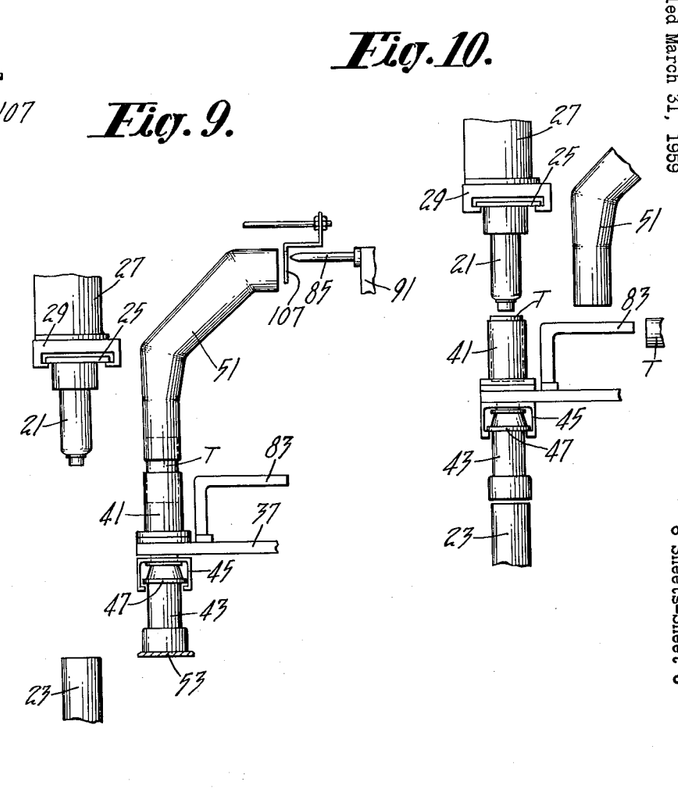

Turning to FIG. 9 it will be seen that, triggered by the retraction of slide 37, the carriage 91 has been raised, e.g. by cylinder 93, so that pins 85, 87 and 89 and the fresh tubes T carried thereby have been spread, via springs 97 and cams 103 and 105, into alignment with the mouths of chutes 51. Moreover, as the carriage 91 reaches the top of its travel, it triggers a quick reciprocatory motion of the cylinder 109 to advance and retract stripper plate 107, thereby thrusting tubes T into chutes 51 where they drop directly into the waiting cups 41 on the upper surface of the retracted slide 37. Completion of this reciprocation, or even of the advancing portion thereof, triggers cylinder 93 to return carriage 91 to lowered position.

FIGURE 9 also illustrates that at any suitable time, according to the timing cycle of the machine 11, the cylinder 31 will be actuated to raise the pick-up head 27, thereby opening the next set of dies 19 and holding them open awaiting the next loading-unloading incursion of the slide 37.

In the meantime, of course (referring to FIG. 5), the time delay, either that introduced by the device 75 initiated by the closing of switch 79 simultaneously with the closing of switch 67 or the delay otherwise fed in from the machine cycle, has run its course. Accordingly switch 69 is closed completing the circuit to solenoids 61 and 65 with the result that entrance gate 59 is opened and exit gate 63 is closed. The conveyor chain 53 frictionally advances the waiting column of holders 43 against gate 63 which locates the three leading holders in proper positon beneath the slide 37 with their rings suitably positioned for coaction with the clamp 45. The slide is now completely charged with new tubes T in the cups 41 and empty holders 43 in position in its clamp 45.

The opening of the dies 19 is preferably set to occur as soon as possible after the indexing of table 13 is complete. Advancing motion of slide 37 is then brought about by triggering the cylinder 39 in response to satisfaction of any suitable readiness test or tests as is well understood. For example, any suitable timing operation on the machine so selected as to actuate a switch long enough after the withdrawal of the slide 37 to insure completion of all the charging and discharging functions, plus a series switch actuated by the pick-up head 27 when in its raised position could be used to complete a circuit triggering slide cylinder 39 and causing a projecting motion thereof towards the FIG. 1 position. As the slide 37 first starts out from its retracted position, it releases switch 67, thus opening the circuit controlling solenoids 61 and 65, and thereby projecting gate 59 to arrest the column of holders 43 and withdrawing gate 63 to make the conveyor ready to carry off the filled holders brought to it by the slide on its next retraction. When the slide reaches extended position, the parts are in their initially described position, terminating a complete cycle of operation, which cycle repeats periodically, once for each work operation at the work station of machine 11.

From the foregoing it can be seen that the present invention provides for the swift and accurate supply of parts to and removal of work from an assembly machine, in a controlled and accurate fashion, not only in the case of parts or work of general character but especially when there are involved relatively delicate shapes and materials of flexible tubular form.

While, in order to comply with the statute, the invention is described in language which is rather specific as to structural features and arrangements, it is to be understood that the invention is not limited to the specific details shown, but that the means herein disclosed comprises the preferred of several modes of putting the invention into effect, and the invention is therefore claimed in any of its forms or modifications within the scope of the language employed in the appended claims.

I claim:

1. In a device for loading and unloading an assembly machine having an indexable supporting means, sets of cooperating but vertically separable upper and lower working members spaced along said means and sequentially indexable thereby into an unloading station together with means for separating and reclosing each of said sets upon arrival at said station, a reciprocable slide positioned adjacent said station and having a head movable between an extended position entering the station when the working members thereat are separated and a retracted position to one side thereof, means for reciprocating said slide in timed relation with the operation of said separating and reclosing means, means adjacent the retracted position of said head for loading thereon a preformed part to be incorporated in a completed article, means also adjacent the retracted position of said head for simultaneously removing completed articles from the head, and means operable when the head is in its extended position for transferring a preformed part carried thereby to one of said working members and for transferring a completed article from the other of said working members to said head.

2. A device as set forth in claim 1 in which the preformed parts are carried on the upper surface of the head of the slide and the completed articles are carried on its under surface.

3. In a device for unloading an assembly machine having an indexable supporting means, sets of cooperating but vertically separable upper and lower working members spaced along said means and sequentially indexable thereby into an unloading station together with means for separating and reclosing each of said sets upon arrival at said station, a reciprocable slide positioned adjacent said station and having a head movable between an extended position entering the station when the working members thereat are separated and a retracted position to one side thereof, means for reciprocating said slide in timed relation with the operation of said separating and reclosing means, receptor means on the under surface of said head for receiving and holding a completed article discharged by an upward thrust from the lower member of one of said working member sets, and means associated with the lower working member of each set for ejecting a completed article upwardly therefrom into the control of said receptor means.

4. In a device for loading an assembly machine having an indexable supporting means, sets of cooperating but vertically separable upper and lower working members spaced along said means and sequentially indexable thereby into an unloading station together with means for separating and reclosing each of said sets upon arrival at said station, a reciprocable slide positioned adjacent said station and having a head movable between an extended position entering the station when the working members thereat are separated and a retracted position to one side thereof, means for reciprocating said slide in timed relation with the operation of said separating and reclosing means, upwardly opening carrier means on the upper surface of said head for receiving a preformed part to be fed to the working members, means associated with the upper working member of each set for engaging and holding said preformed part upon dipping of said upper working member into contact with said part, in said carrier means, and means for thus dipping said member while said slide is in extended position.

5. In a device for loading and unloading an assembly machine having an indexable supporting means, sets of cooperating but vertically separable upper and lower working members spaced along said means and sequentially indexable thereby into an unloading station together with means for separating and reclosing each of said sets upon arrival at said station, a reciprocable slide positioned adjacent said station and having a head movable between an extended position entering the station when the working members thereat are separated and a retracted position to one side thereof, means for reciprocating said slide in timed relation with the operation of said separating and reclosing means, receptor means on the under surface of said head for receiving and holding a completed article discharged by an upward thrust from the lower member of one of said working member sets, upwardly opening carrier means on the upper surface of said head for receiving a preformed part to be fed to the working members, means associated with the upper working member of each set for engaging and holding said preformed part upon dipping of said upper working member into contact with said part in said carrier means, means associated with the lower working member of each set for ejecting a completed article upwardly therefrom into said receptor means, and means for simultaneously dipping said upper working member and actuating said ejecting means when the head of said slide is in extended position.

6. A device as set forth in claim 3 wherein the receptor means comprises a holder separable from the remainder of said head and held in engagement therewith by releasable connecting means.

7. A device as set forth in claim 6 wherein the connecting means includes a pickup clamp by which the holder may be raised and held up against the bottom of said head, or may be released for removal and replacement, and operating means to actuate and release said clamp.

8. A device as set forth in claim 7 wherein there is also provided a conveyor having a flight extending beneath the retracted position of the head of the slide, upon which conveyor said holder may be released by said clamp when the head is in retracted position, said clamp operating means being arranged to actuate the clamp while the slide is moving or extended, and to release said clamp when the slide is retracted.

9. A device as set forth in claim 8 in which the clamp has a channel configuration running athwart the slide, and the conveyor runs parallel thereto for carrying filled carriers laterally away from the slide and introducing empty replacement carriers into the clamp channel.

10. A device as set forth in claim 9 including reciprocatory gates acting transversely of said conveyor, one at each side of said slide for controlling the flow of carriers away from and into the clamp.

11. A device as set forth in claim 4 including chute means so located as to discharge into the carrier means when the slide is in retracted position, and means for automatically depositing a preformed part in the chute means at each retraction of the slide.

12. A device as set forth in claim 11 wherein the articles to be loaded are flexible tubes and wherein the slide has a plurality of carriers for loading a plurality of said tubes at one operation and a corresponding number of chutes, said device also including a track presenting a supply of tubes in side-by-side contacting array adjacent said slide with a normal center spacing substantially less than that of the inlets to said chutes, and wherein said last-named means comprises means for extracting from the track a number of tubes equivalent to the number of said carriers, means for separating the extracted tubes to a center spacing equal to that of said chutes, and means for depositing the separated tubes in said chutes.

13. A device as set forth in claim 12 wherein the separating means includes a support shiftable between a first position and a second position, a plurality of pins carried by said support and shiftable laterally thereon, said pins being aligned in the first support position with the tubes in said track, and means responsive to shifting of said support to its second position for causing separation of said pins on said support to a center spacing equivalent to the chute mouth spacing.

14. A device as set forth in claim 13 wherein the depositing means includes a stripper plate meshable with said pins when the support is in its second position, and reciprocable to strip tubes from said pins and into the mouths of said chutes.

15. A device as claimed in claim 14 wherein the extracting means comprises a pusher mounted on the slide and reciprocable therewith.

16. In a device for unloading an assembly machine having an indexable support means, with extendable and retractable working members carrying workpieces thereon and spaced along said means and sequentially indexable thereby into an unloading station, a conveyor running past said station, a slide above and reciprocable transversely of the conveyor to and from a position overlying that working member which is momentarily at the unloading station and having a vertically movable pickup channel clamp on its under surface, the clamp when in lower position with the slide at one end of its travel being positioned to embrace within its channel holders traveling along said conveyor, means to raise said clamp to clamp a holder therein to said slide and raise it from said conveyor, and means to actuate said slide to translate the clamped holder to a position laterally of said conveyor and overlying a working member to receive therefrom a workpiece about to be discharged from the machine.

References Cited in the file of this patent

UNITED STATES PATENTS

| | | |
|---|---|---|
| 1,575,185 | Stenhouse | Mar. 2, 1926 |
| 1,795,665 | Miller | Mar. 10, 1931 |
| 2,081,580 | Diffenderffer | May 25, 1937 |
| 2,375,252 | Sayre | May 8, 1945 |
| 2,380,084 | Strauss | July 10, 1945 |
| 2,675,584 | Fienberg et al. | Apr. 20, 1954 |
| 2,873,475 | Linhorst | Feb. 17, 1959 |
| 2,883,072 | Louden | Apr. 21, 1959 |
| 2,950,671 | Allen et al. | Aug. 30, 1960 |